United States Patent [19]
Baker et al.

[11] Patent Number: 5,775,490
[45] Date of Patent: Jul. 7, 1998

[54] COMPACT DISK PACKAGE

[75] Inventors: Mark P. Baker, Fort Wayne, Ind.; Allen M. Brandenburger, Clarkston, Ga.; Richard F. House, St. Charles, Ill.; William H. Perkins, Oxford, Ohio

[73] Assignee: Jefferson Smurfit Corporation, Clayton, Mo.

[21] Appl. No.: 542,512

[22] Filed: Oct. 11, 1995

[51] Int. Cl.$^6$ .................................................... B65D 85/57
[52] U.S. Cl. ....................... 206/308.1; 206/309; 206/312
[58] Field of Search ......................... 206/308.1, 309, 206/310, 312, 495

[56] References Cited

U.S. PATENT DOCUMENTS

| | | | |
|---|---|---|---|
| 3,199,768 | 8/1965 | Formlett | 206/312 |
| 3,785,478 | 1/1974 | Drori | 206/312 |
| 5,188,229 | 2/1993 | Bernstein | 206/310 |
| 5,372,253 | 12/1994 | O'Brien et al. | 206/310 |
| 5,460,265 | 10/1995 | Kiolbasa | 206/308.1 |

*Primary Examiner*—David T. Fidei
*Attorney, Agent, or Firm*—Richard W. Carpenter

[57] ABSTRACT

A package for shipping and/or a compact disk. The package is formed from a one-piece blank of foldable paperboard and includes a rear panel, an overlying retaining panel having a retaining tab engageable with a compact disk, an overlying outer cover panel, and a plurality of inner panels interposed between the rear and cover panels.

19 Claims, 7 Drawing Sheets

COMPACT DISK PACKAGE

BACKGROUND OF THE INVENTION

1. Field of the Invention

This invention relates to packages for shipping and storing compact disks, and more particularly to packages formed of foldable sheet material, such as paperboard.

2. Description of the Background Art

A background art search directed to the subject matter of this invention conducted in the United States Patent and Trademark Office disclosed the following United States Letters Patent:

| | | | |
|---|---|---|---|
| 1,303,299 | 1,372,604 | 1,463,413 | 1,495,953 |
| 1,774,215 | 2,333,798 | 2,354,066 | 2,828,063 |
| 2,839,236 | 3,102,635 | 3,522,907 | 3,528,602 |
| 3,870,223 | 4,419,837 | 4,508,366 | 4,511,034 |
| 4,610,392 | 4,620,630 | 4,635,797 | 4,653,639 |
| 4,676,374 | 4,694,954 | 4,709,812 | 4,727,988 |
| 4,795,287 | 4,795,287 | 4,848,648 | 4,850,731 |
| 4,850,731 | 4,852,740 | 4,905,831 | 4,930,681 |
| 5,048,681 | 5,085,318 | 5,088,599 | 5,090,561 |
| 5,101,973 | 5,147,036 | 5,154,284 | 5,186,327 |
| 5,188,229 | 5,199,743 | 5,205,405 | 5,207,717 |
| 5,248,032 | 5,284,242 | 5,289,918 | 5,290,118 |
| 5,307,927 | 5,310,053 | 5,318,222 | 5,333,728 |
| 5,366,074 | 5,370,224 | 5,372,253 | 5,408,366 |
| AU 284,629 | CH 678,370 | DE 4,000,230 | DE 4,133,465 |
| DE 4,221,127 | DES 261,155 | DES 315,504 | EP 335,826 |
| FR 2,248,693 | GB 192,283 | GB 2,187,442 | GB 2,219,573 |
| JP 402,004,685 | JP 403,256,884 | JP 406,156,570 | NL 8,702,565 |
| SU 1,316,922 | WO 93/17433 | WO 93/24927 | WO 94/01866 |
| WO 94/22742 | | | |

None of the patents uncovered in the search discloses a paperboard compact disk package that includes a rear panel, an overlying retaining panel having a retaining tab engageable with a compact disk, an overlying outer cover panel, and a plurality of inner panels interposed between the rear and cover panels.

SUMMARY OF THE INVENTION

It is a primary object of the invention an improved paperboard package for shipping and storing a compact disk.

Another object of the invention is the provision of a compact disk package that is far more economical to produce than the so-called "jewel case" package, currently in common use and which is an expensive hinged plastic box.

A more specific object of the invention is to provide a one-piece folded paperboard package, with a film overwrap, that includes a rear panel, an overlying retaining panel having a retaining tab engageable with a compact disk, an overlying outer cover panel, and a plurality of inner panels interposed between the rear and cover panels.

These and other objects of the invention will be apparent from an examination of the following description and drawings.

BRIEF DESCRIPTION OF THE DRAWINGS

It will be understood that, for purposes of clarity, certain elements may have been omitted from certain views where they are believed to be illustrated to better advantage in other views.

DESCRIPTION OF THE PREFERRED EMBODIMENT

Figure 1:
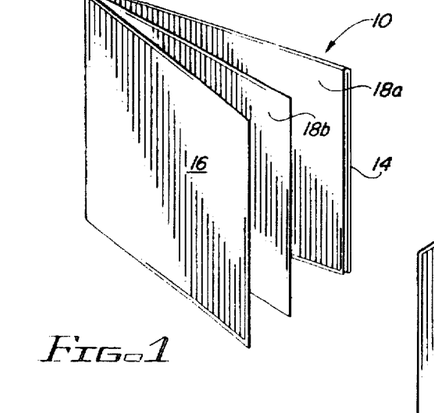
FIG. 1 is an isometric view of a compact disk package embodying features of the invention, shown in a partly open position.
Figure 2:
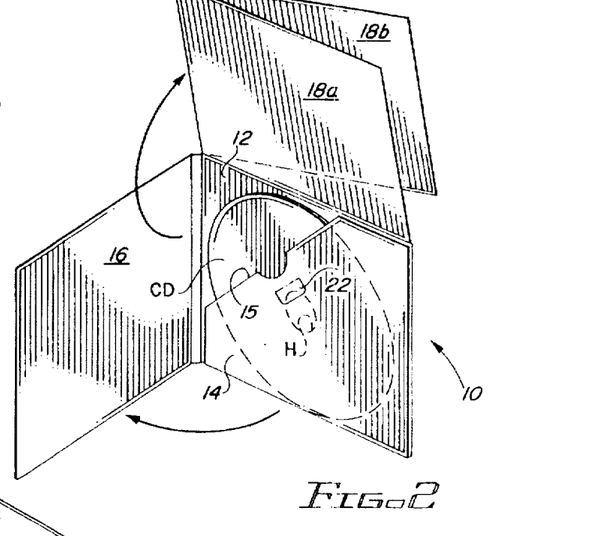
FIG. 2 is a view similar to that of FIG. 1, showing the next step in opening the package.
Figures 3, 8, 9:
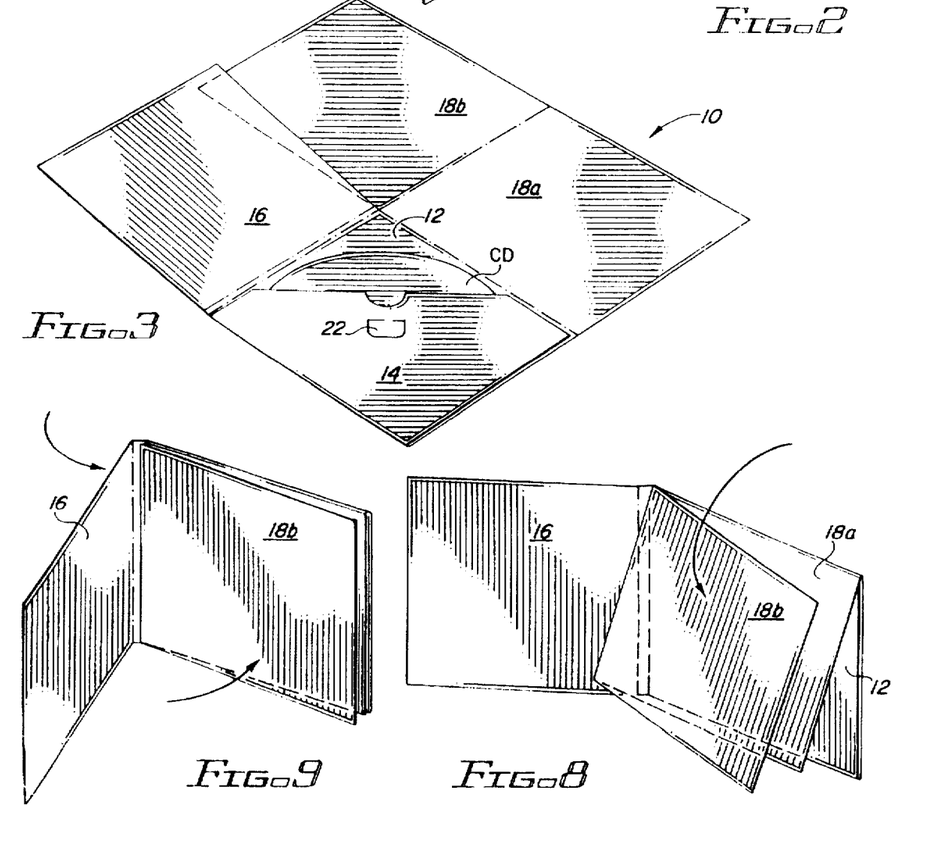
FIG. 3 is an isometric view of the structure of FIG. 1, showing the completely opened package.
FIGS. 5–9 are views of portions of the structure illustrated in FIG. 1, showing sequential steps in forming the package.
Figure 4:
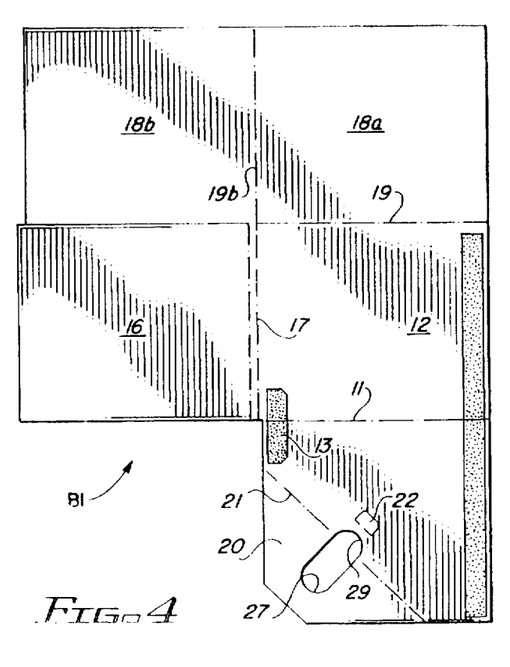
FIG. 4 is a top plan view of a blank of foldable paperboard from which a compact disk package embodying features of the invention and illustrated in FIGS. 1–3 may be formed.

Referring now to the drawings for a better understanding of the invention, it will be seen that the compact disk package, indicated generally at 10 in FIGS. 1–3, may be formed from the unitary blank B1 of foldable paperboard illustrated in FIG. 4.

Blank B1 includes a rear panel 12, a retaining panel 14, an outer cover panel 16, and first and second inner panels 18a and 18b, respectively, all of which are square and of the same size as rear panel 12, except retaining panel 14, which is pentagonal.

Figure 5:
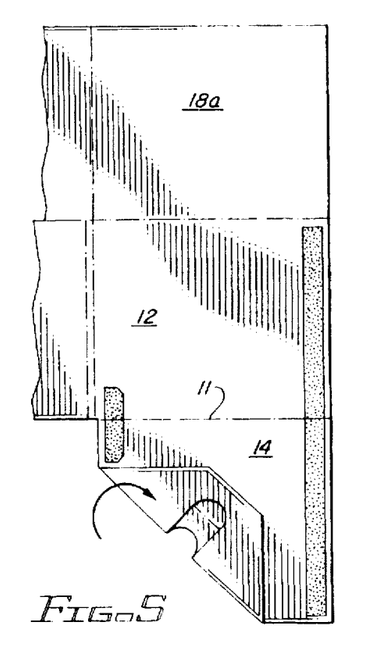
Figure 6:
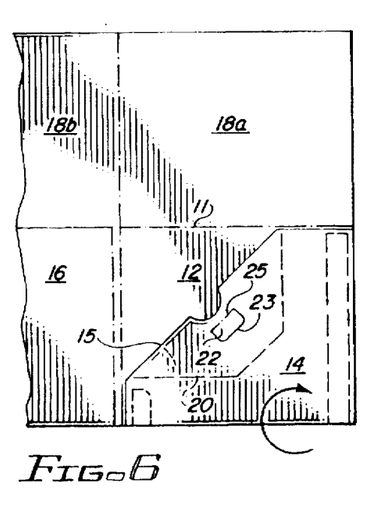
Figure 7:
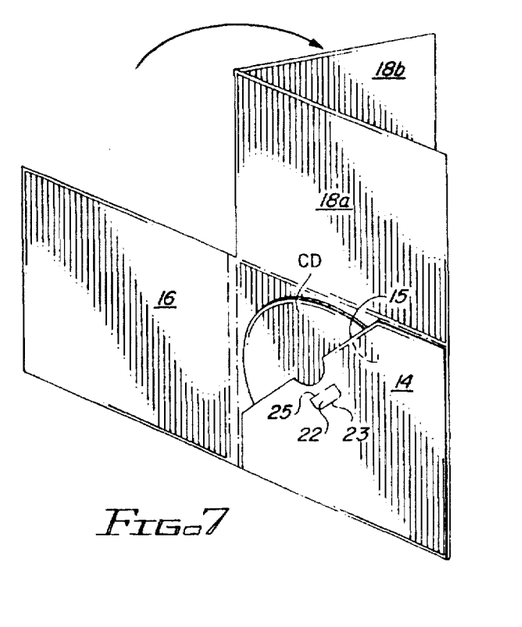

As best seen in FIGS. 5–7, retaining panel 14 is foldably joined at one edge, along fold line 11, to the lower edge of rear panel and is folded 180 degrees to overlie a lower portion of rear panel 12. Marginal portions of panel 14 may be adhesively secured to the front surface of rear panel 12 in the areas indicated at 13.

Retaining panel 14 may be reinforced by a relatively narrow reinforcing flap 20 which is foldable joined, along diagonal fold line 21, to the sloping upper edge of retaining panel 14 and which is folded 180 degrees to underlie the adjacent upper marginal area of the retaining panel.

In this way, a space or pocket 15 is formed between the front surface of rear panel 12 and the rear surface of retaining panel 14 for receiving and holding a compact disk CD having a circular central opening or hole indicated at H.

In order to help retain a compact disk in the pocket 15, there may be provided a relatively small retaining tab 22 formed from material of retaining panel 14 and defined by a U-shaped cut line 23 and a fold line 25. Tab 22 is adapted to be received within central opening H of compact disk CD.

In order to uncover retaining tab 22, reinforcing flap 20 may be provided with a recess 27, which is aligned with a related recess 29 in the adjacent edge of the retaining panel 14.

Cover panel 16 is foldably joined to a side edge of rear panel 12, along a preferably double scored fold line 17, that is normal to and adjacent fold line 11, that joins retaining panel 14 to rear panel 12.

First inner panel 18a is foldably joined, along a fold line 19a, to an upper edge of rear panel 12; and second inner panel 18b is foldably joined, along a fold line 19b to an adjacent side edge of first inner panel 18a.

After the paperboard CD package 10 has been loaded with a compact disk CD, first and second inner panels 18a and 18b are folded 180 degrees to overlie outer cover panel 16 and retaining panel 14, respectively. Then outer cover panel 26 and second inner panel 24 are folded 180 degrees to overlie the remaining panels to form a square package.

Thus, it should be appreciated that the invention provides a simple, relatively inexpensive to produce, paperboard, compact disk package that present many surfaces for printed areas describing the packaged product or for other advertising messages.

Now turning to FIGS. 10–20, it will be seen that a modified form of the invention is illustrated. The compact disk package 110 shown in FIGS. 10–14, may be formed from the unitary blank B2 of foldable paperboard illustrated in FIG. 15.

In this embodiment of the invention, as well as in the other embodiments described hereinafter, elements corresponding to elements of the first described embodiment are identified by similar or related numerals.

Figures 15, 16, 17, 18, 19, 20:
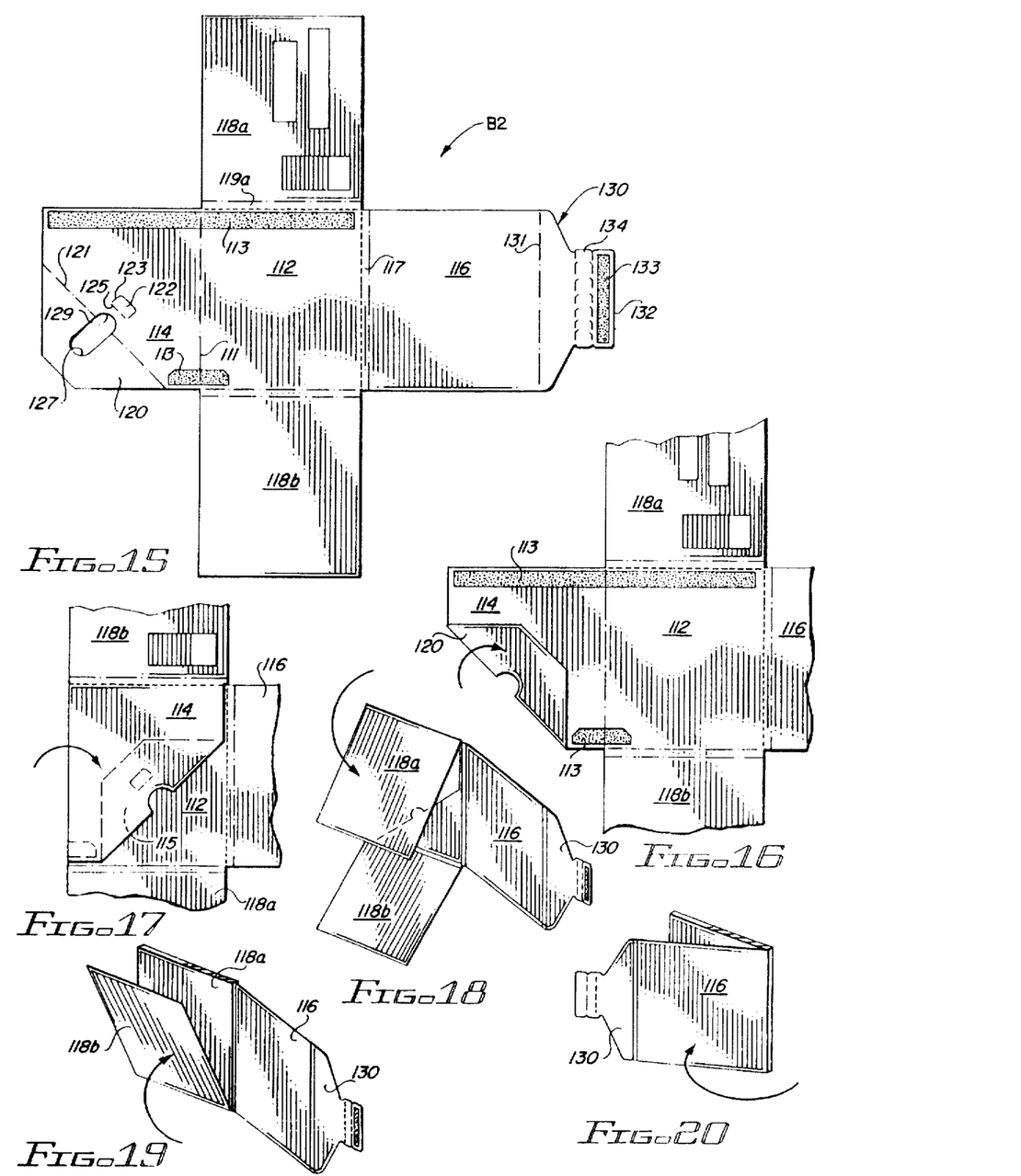
FIG. 15 is a top plan view of a blank of foldable paperboard from which a compact disk package embodying features of the invention and illustrated in FIGS. 10–14 may be formed.
FIGS. 16–20 are views of portions of the structure illustrated in FIG. 15, showing sequential steps in forming the package.

Blank B2 includes a rear panel 112, a retaining panel 114, an outer cover panel 116, and first and second inner panels 118a and 118b, respectively, all of which are square and of the same size as rear panel 112, except retaining panel 114, which is pentagonal.

As best seen in FIGS. 15–17, the arrangement and construction of the rear panel 112, the retaining panel 114, the retaining tab 122, and the reinforcing flap 120, as well as the relation between these elements is the same as the corresponding elements of the first described embodiment of the invention illustrated in FIGS. 1–9.

The difference between the two forms of the invention lies in the construction of the outer cover panel 116 and the arrangement of the cover panel and the first and second inner panels 118a and 118b relative to the rear panel 112.

Figures 10, 11, 12, 13, 14:
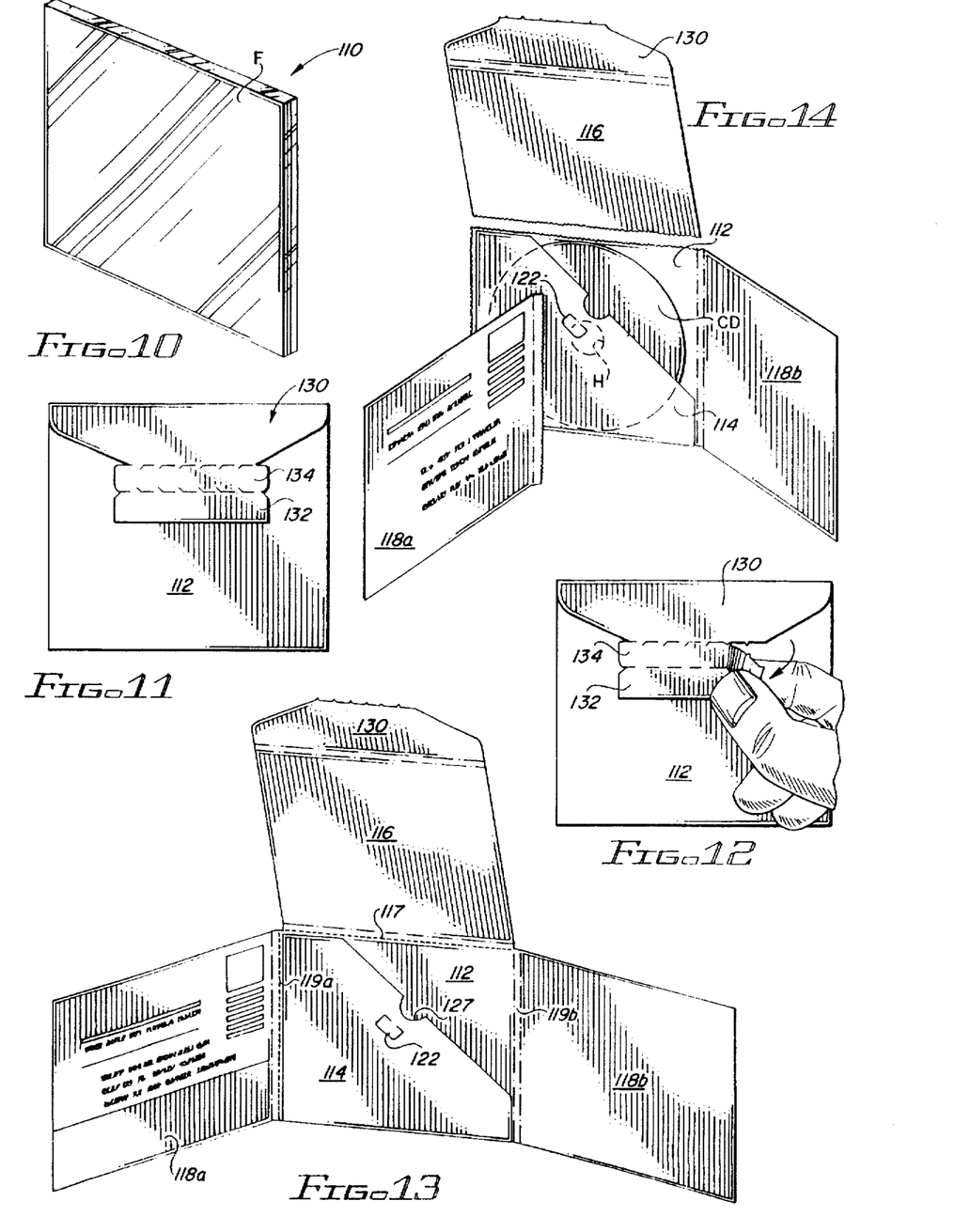
FIG. 10 is an isometric view of a compact disk package embodying another form of the invention, shown in a closed condition prior to opening.
FIG. 11 is a rear side elevational view of the structure illustrated in FIG. 10.
FIG. 12 is a view similar to that of FIG. 1, showing a step in the opening of the package.
FIGS. 13 and 14 are isometric views of the package illustrated in FIG. 12, showing additional steps in opening the package and removing portions of the structure.

As best seen in FIGS. 13–15 and, outer cover panel 116 is foldably joined to an upper edge of rear panel along a fold line 117, which is preferably double scored with one of the score lines being a weakened line of tear that allows the cover panel 116 to be detached from the rear panel 112, as described later herein.

A closure flap 130 is foldably joined, along a fold line 131, to a the upper edge of rear panel 112. Closure flap 130 includes a free end portion 132 separated from the main body of the closure flap by a detachable tear strip 134.

Still referring to FIGS. 13–15, it will be seen that first inner panel 118a is foldably joined to one side edge of rear panel 112, along a fold line 119a, which is preferably double scored with one of the score lines being a weakened line of tear that allows inner panel 118a to be detached from the rear panel 112, as described later herein. Second inner panel 118b is foldably joined to the opposite side edge of rear panel 112 along a fold line 119b.

After a compact disk has been inserted into pocket 115 between the rear and retaining panels 112 and 114, respectively, first and second inner panels 118a and 118b, respectively, are folded inwardly 180 degrees to overlie each other and the rear and retaining panels 112 and 114.

At this time, cover panel 126 may be folded 180 degrees to overlie all of the other panels. Then closure flap 130 is folded 180 degrees to underlie a marginal portion of rear panel 112. Cover flap free end portion may be adhesively secured to the rear surface of rear panel 112 by an adhesive indicated at 133.

When the outer cover panel 116 is folded 180 degrees to overlie the remaining panels, a square package is formed which may be provided with a clear plastic film overwrap indicated at F. Although not previously mentioned herein all of the embodiments of the present invention may or may not provided with a film overwrap, as desired.

In order to open the package, after the film overwrap F has been removed, Tear strip 134 is detached from closure flap to afford access to the interior of the package.

As previously mentioned, both the cover panel 116 and the first inner panel 118a may by joined to rear panel 112 by weakened lines of tear which permit their detachment and removal. One advantage of this arrangement is that the inner panel 118a may by used as a post card after its removal. If desired both the cover panel and the first inner panel may be detached when the package is used for permanently storing a compact disk.

Now turning to FIGS. 21–31, it will be seen that another modified form of the invention is illustrated. The compact disk package 210 shown in FIGS. 21 and 22, may be formed from the unitary paperboard blank B3 illustrated in FIG. 23.

In this embodiment of the invention elements corresponding to elements of the previously described embodiments are identified by related or similar numerals.

Figures 23, 25:
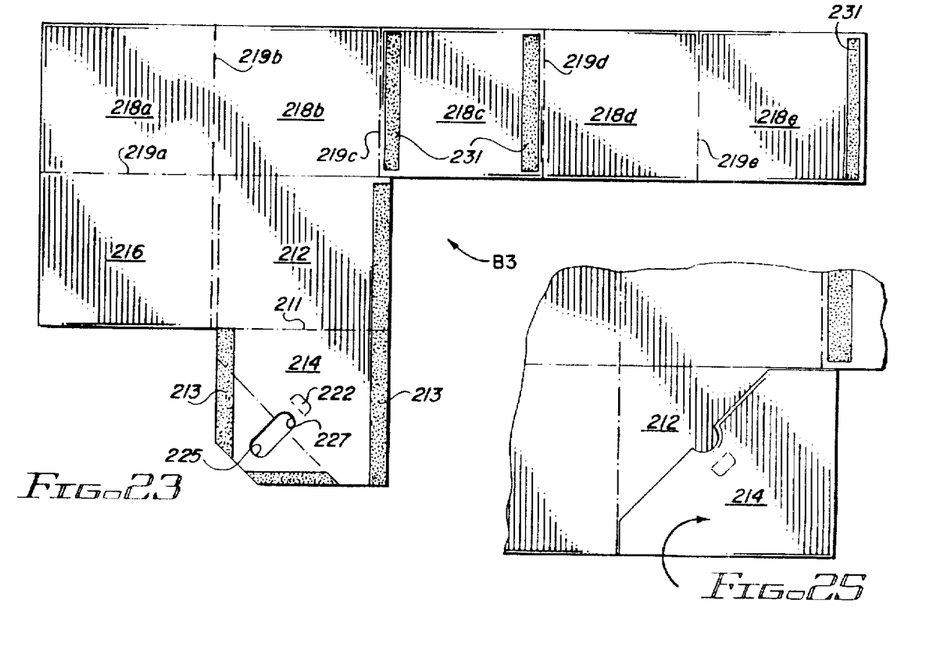
FIG. 23 is a top plan view of the blank of foldable paperboard from which the package illustrated in FIGS. 21 and 22 may be formed.
FIGS. 24–31 are views of portions of the structure illustrated in FIG. 15, showing sequential steps in forming the package.

Blank B3 includes a rear panel 212, a retaining panel 214, an outer cover panel 216, and first, second, third, fourth, and fifth inner panels 218a, 218b, 218c, 218d, and 218e, respectively, all of which are square and of the same size as rear panel 212, except retaining panel 214, which is pentagonal.

Figure 24:
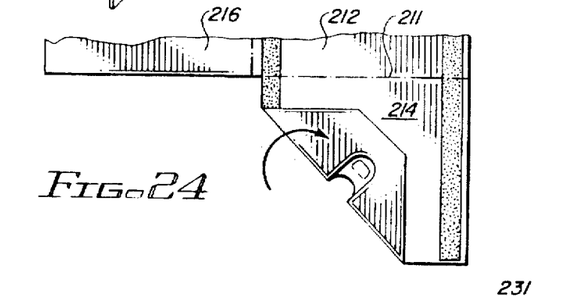
Figures 26, 27:
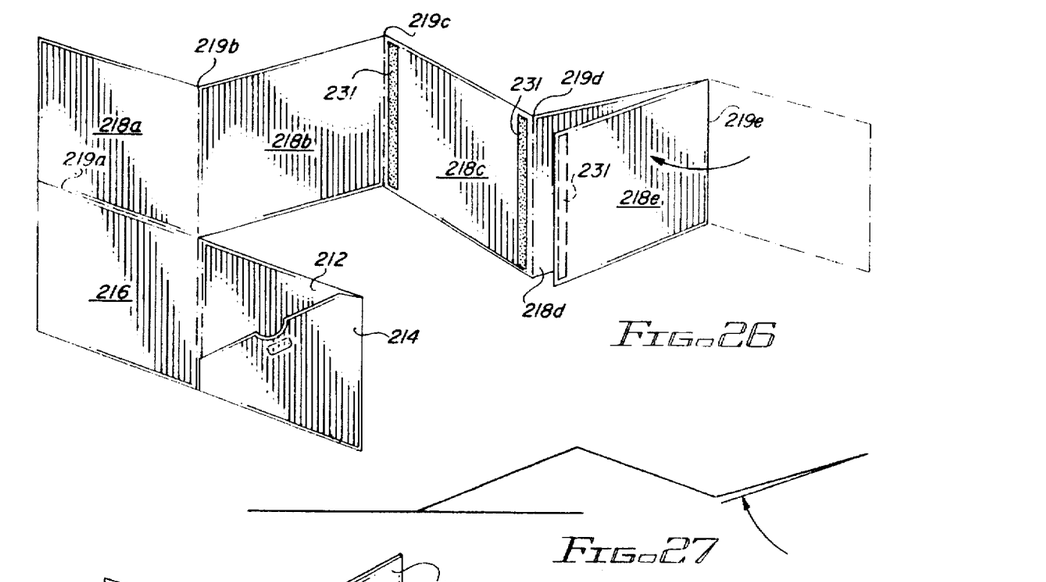
Figure 28:
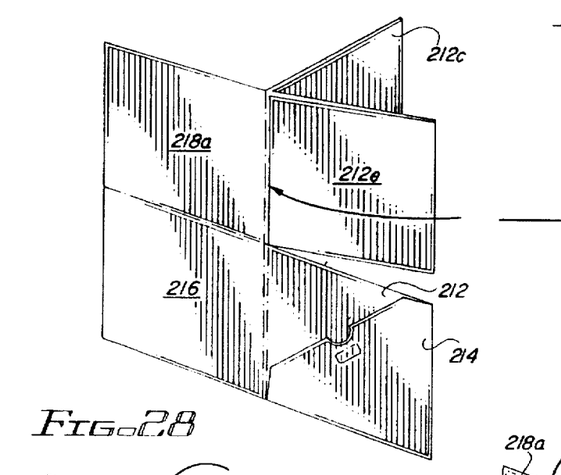
Figure 29:
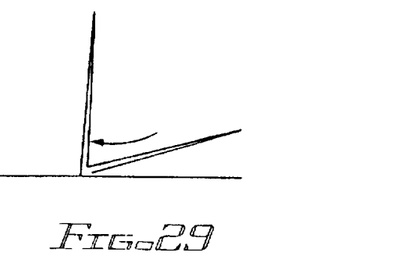
Figure 30:
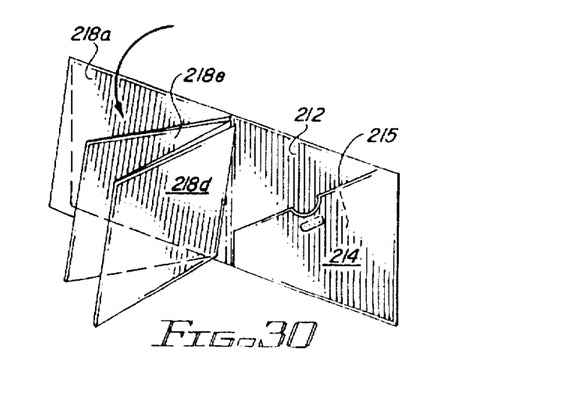
Figure 31:
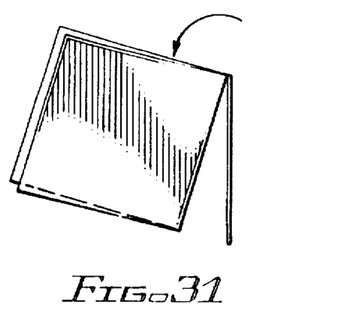

As best seen in FIGS. 23–25, the arrangement and construction of rear panel 212, retaining panel 214, retaining tab 222, and reinforcing flap 220, as well as the relation between these elements is the same as the corresponding elements of the previously described embodiments.

The difference between the forms of the invention lies in the arrangement of outer cover panel 216 and the five inner panels and their relation to rear panel 212.

As best seen in FIG. 23, outer cover panel 216 is foldably joined to a side edge of rear panel 212, along a fold line 217 the is adjacent and normal to fold line 211 which joins retaining panel 214 to rear panel 212.

A first inner panel 218a is foldably joined to an upper edge of cover panel 216 along fold line 219a that is normal to line 217. First, second, third, fourth, and fifth inner panels 218a, 218b, 218c, 218d, and 218e are sequentially foldably joined to each other along fold lines 219b, 219c, 219d, and 219e, respectively.

All of the inner panels are joined to each other on fold lines that are parallel to each other and normal to the fold line joining the first inner panel 118a to the cover panel 216. Also, all of the inner panels are free from attachment to the rear panel.

After the blank B3 has been formed, fourth and fifth inner panels 218d and 218e may be secured to each other in back-to-back relation, and second and third inner panels 218b and 218c may also be adhesively secured to each other in back-to-back relation. The adhesive patterns are indicated at 231.

When the package has been filled with a compact disk, the inner panels may first be folded so that fourth and fifth inner panels 218d and 218e overlie first inner panel 218a. Then the inner panels may again be folded so that first, fourth, and fifth inner panels 218a, 218d, and 218e overlie cover panel 216; and second and third inner panels 218b and 118c overlie rear panel 212 and retaining panel 214.

Figure 21:
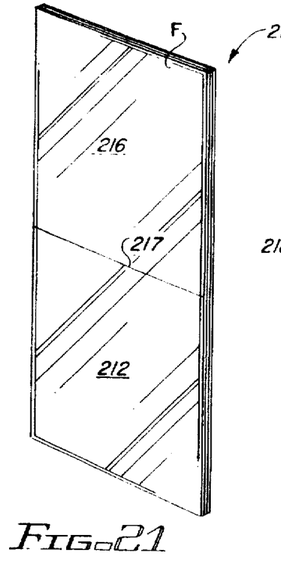
FIG. 21 is an isometric view of a compact disk package embodying another form of the invention, shown in a closed condition, especially suitable for display, prior to opening.
Figure 22:
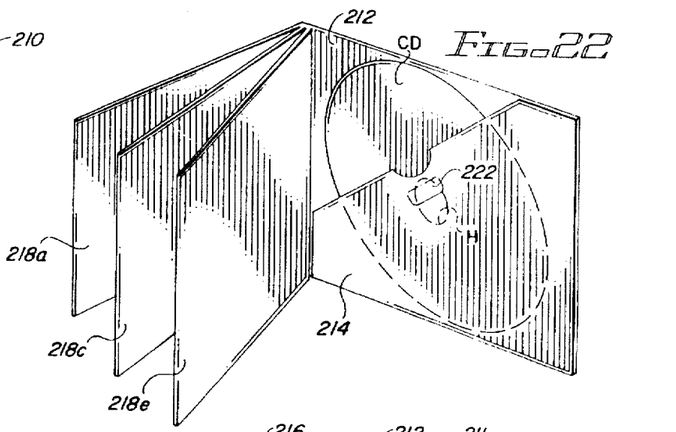
FIG. 22 is an isometric view if the package illustrated in FIG. 21, shown in a partly open condition.

As best seen in FIG. 21, this forms an oblong rectangular package which may then be overwrapped with a clear plastic film F. In this way a larger package with more room for advertising copy is available for display.

Once the package has been initially opened, it can the by refolded with all of the panels overlying each other to form a smaller square package.

Now turning to FIGS. 32-36, it will be seen that another modified form of the invention is illustrated. The compact disk package 310 shown in FIGS. 32 ans 33, may be formed from the unitary paperboard blank B4 illustrated in FIG. 34.

In this embodiment of the invention elements corresponding to elements of the previously described embodiments are identified by related or similar numerals.

Figures 32, 33, 34, 35, 36:
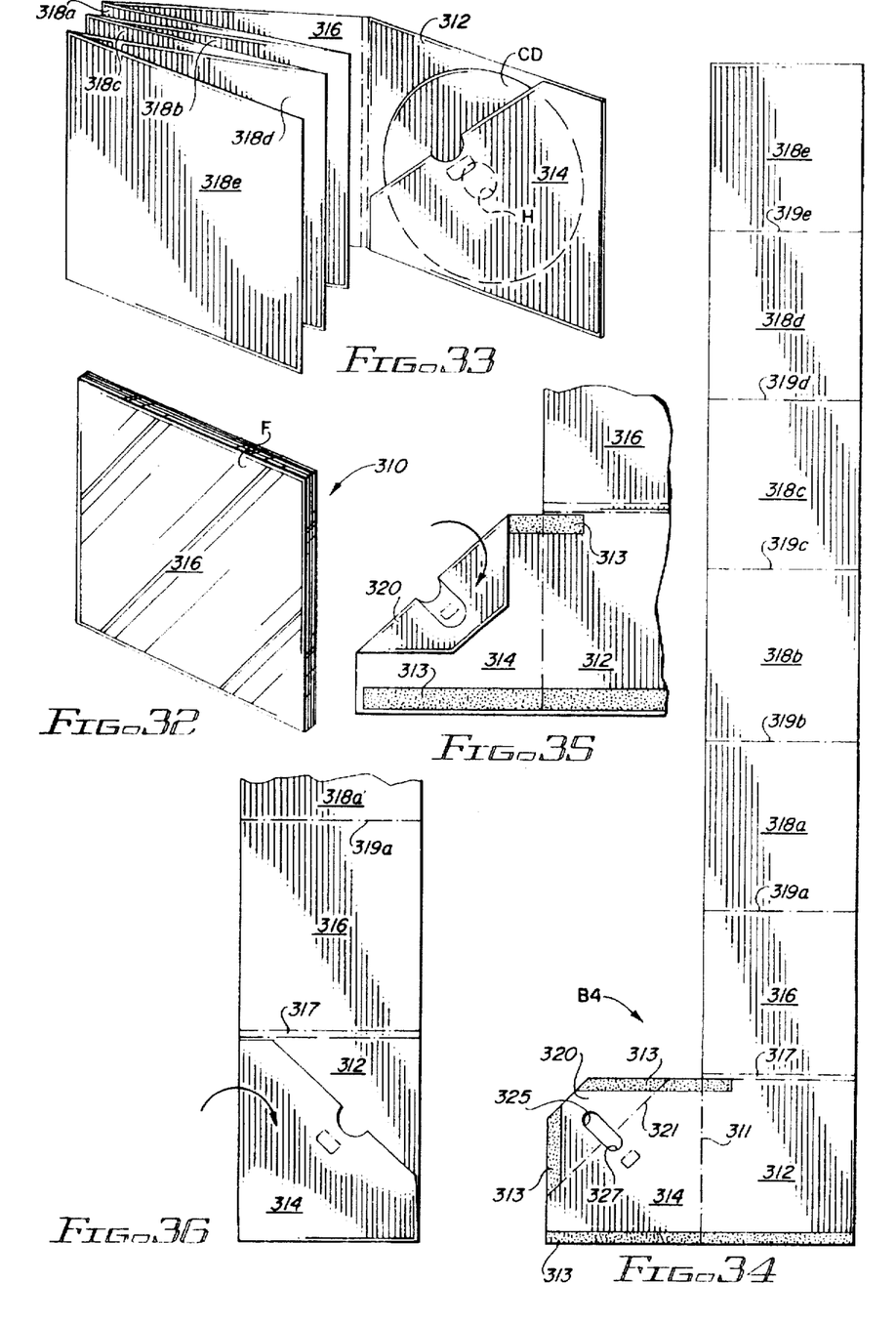
FIG. 32 is an isometric view of a compact disk package embodying another form of the invention, shown in a closed condition prior to opening.
FIG. 33 is an isometric view if the package illustrated in FIG. 21, shown in a partly open condition.
FIG. 34 is a top plan view of the blank of foldable paperboard from which the package illustrated in FIGS. 21 and 22 may be formed.
FIGS. 35 and 36 are views of portions of the structure illustrated in FIG. 15, showing sequential steps in forming the package.

Blank B4 includes a rear panel 312, a retaining panel 314, an outer cover panel 316, and first, second, third, fourth, and fifth inner panels 318a, 318b, 318c, 318d, and 318e, respectively, all of which are square and of the same size as rear panel 312, except retaining panel 314, which is pentagonal.

As best seen in FIGS. 34-36, the arrangement and construction of rear panel 312, retaining panel 314, retaining tab 322, and reinforcing flap 320, as well as the relation between these elements is the same as the corresponding elements of the previously described embodiments.

The difference between the forms of the invention lies in the arrangement of outer cover panel 316 and the five inner panels and their relation to rear panel 312.

As best seen in FIG. 34, cover panel 316 is foldably joined to a side edge of rear panel 312, along a fold line 317 that is normal to and adjacent fold line 311.

A first inner panel 318a is foldably joined to a side edge of cover panel 316 along fold line 319a that is normal to and adjacent fold line 317, which joins retaining panel 314 to rear panel 312.

First, second, third, fourth, and fifth inner panels 318a, 318b, 318c, 318d, and 318e are sequentially foldably joined to each other along fold lines 319b, 319c, and 319d, respectively.

It should be noted that all of the inner panels are joined to each other on fold lines that are parallel to each other and also parallel to the fold line 317 joining the cover panel 316 to rear the panel 312.

Again, it should be understood that the invention provides a simple, relatively inexpensive to produce, paperboard, compact disk package that present many surfaces for printed areas describing the packaged product or for other advertising messages.

What is claimed is:

1. A package for holding a compact disk, said package being formed from a unitary blank of foldable sheet material, such as paperboard, and comprising:

(a) a rectangular rear panel;

(b) a smaller, pentagonal, retaining panel having:
 (i) adjacent first and second side edges extending from each other and in a direction normal to each other;
 (ii) a third side edge extending from said second side edge in a direction normal to said second side edge and parallel to said first side edge;
 (iii) a fourth side edge extending from said first side edge in a direction normal to said first side edge and parallel to said second side edge;
 (iv) a fifth side edge extending diagonally between said third and fourth side edges;

(c) said retaining panel being foldably joined, along said first side edge, to a first side edge of said rear panel and being adhesively secured to said rear panel along areas adjacent other of said retention panel side edges;

(d) a retaining tab, cut from material of and foldably joined to said retaining panel, inwardly adjacent said fifth side edge, for engagement with a central opening in said compact disk to retain said compact disk under said retaining panel;

(e) a rectangular outer cover panel foldably joined to one of said rear panel side edges and folded to overlie said rear panel;

(f) a rectangular first inner panel foldably joined to one of said rear and cover panels;

(g) a rectangular second inner panel foldably joined to one of said rear and first inner panels;

(h) said first and second inner panels being interposed between said rear panel and said cover panel.

2. A package for holding a circular compact disk, said package being formed from a unitary blank of foldable sheet material, such as paperboard, and comprising:

(a) a rear panel;

(b) a smaller retaining panel having:
 (i) adjacent first and second side edges extending from each other and in a direction normal to each other;
 (ii) a third side edge extending from said second side edge in a direction normal to said second side edge and parallel to said first side edge;
 (iii) a fourth side edge extending from said first side edge in a direction normal to said first side edge and parallel to said second side edge;
 (iv) a fifth side edge extending diagonally between said third and fourth side edges;

(c) said retaining panel being foldably joined, along said first side edge, to a first side edge of said rear panel and being adhesively secured to said rear panel along areas adjacent other of said retention panel side edges;

(d) a retaining tab, cut from material of and foldably joined to said retaining panel, inwardly adjacent said fifth side edge, for engagement with a central opening in said compact disk to retain said compact disk under said retaining panel;

(e) an outer cover panel foldably joined to one of said rear panel side edges and folded to overlie said rear panel.

3. A package for holding a circular compact disk having a central opening, said package being formed from a unitary blank of foldable sheet material, such as paperboard, and comprising:

(a) a rear panel having a lower edge, an upper edge, and a pair of opposed side edges;

(b) a smaller retaining panel having:
   (i) adjacent first and second side edges extending from each other and in a direction normal to each other;
   (ii) a third side edge extending diagonally with respect to said first and second side edges;

(c) said retaining panel being foldably joined, along said first side edge, to a lower edge of said rear panel and being adhesively secured to said rear panel along areas adjacent other of said retention panel side edges;

(d) an outer cover panel foldably joined to another of said rear panel edges and folded to overlie said rear panel;

(e) a retaining tab cut from material of and foldably joined to said retaining panel adjacent said third side edge, for engagement with said compact disk central opening to retain said compact disk under said retaining panel.

4. A package according to claim 2, and including (a) a first inner panel foldably joined to one of said rear and cover panels;

(b) a second inner panel foldably joined to one of said rear and first inner panels;

(c) said first and second inner panels being interposed between said rear panel and said cover panel.

5. A package according to claim 3, and including:

(a) a first inner panel foldably joined to one of said rear panel side edges;

(b) a second inner panel foldably joined to another of said rear inner panel side edges;

(c) said first and second inner panels being interposed between said rear panel and said cover panel.

6. A package according to claim 3 including, a reinforcing flap foldably joined to said retaining panel diagonally extending third edge, folded to underlie a marginal portion of said retaining panel, and having an opening aligned with said retaining tab.

7. A package according to claim 5, wherein said cover panel and one of said inner panels are both detachably joined to said rear panel.

8. A package according to claim 5, wherein said cover panel is detachably joined to said rear panel.

9. A package according to claim 5, wherein one of said inner panels is detachably joined to said rear panel.

10. A package according to claim 1, wherein all of said inner panels are foldably joined to each other along parallel fold lines.

11. A package according to claim 4, wherein all of said inner panels are foldably joined to each other along parallel fold lines.

12. A package according to claim 5, wherein all of said inner panels are foldably joined to each other along parallel fold lines.

13. A package according to claim 5, wherein said first inner panel is foldably joined to both said rear panel and said second inner panel.

14. A package according to claim 5, wherein said first and second inner panels are foldably joined to opposite side edges of said rear panel and wherein said cover panel is foldably joined to another of said rear panel side edges opposite from said rear panel first side edge.

15. A package according to claim 5, wherein all of said inner panels are free from attachment to said outer cover panel.

16. A package according to claim 5, and including third, fourth, and fifth inner panels, and wherein said second and third inner panels are secured to each other in back-to-back relation and said fourth and fifth inner panels are secured to each other in back-to-back relation.

17. A package according to claim 1, wherein all of said panels are folded in overlying relation and overwrapped with film to form a square package.

18. A package according to claim 4, wherein all of said panels are folded in overlying relation and overwrapped with film to form a square package.

19. A package according to claim 16, wherein said first, fourth, and fifth inner panels are arranged and disposed to be folded to overlie said outer cover panel and said second and third inner panels can be folded to overlie said rear and retaining panels and overwrapped with film to form an oblong rectangular package for display, and, in the alternative, all of said panels can be folded into overlying relation to form a square package.

* * * * *